United States Patent [19]

Timm

[11] 4,195,107
[45] Mar. 25, 1980

[54] SELF-ADHESIVE PLASTIC TILE

[75] Inventor: Walter C. Timm, New Windsor, N.Y.

[73] Assignee: GAF Corporation, New York, N.Y.

[21] Appl. No.: 899,899

[22] Filed: Apr. 26, 1978

Related U.S. Application Data

[63] Continuation-in-part of Ser. No. 536,835, Dec. 27, 1974, abandoned.

[51] Int. Cl.² .................... A61F 13/02; E04C 2/20
[52] U.S. Cl. ........................ 428/40; 428/47; 428/352; 428/354; 428/443; 428/516; 428/518; 428/538; 260/27 R; 52/100; 525/220
[58] Field of Search ............... 428/40, 516, 518, 538, 428/352, 443, 354, 43, 47; 260/27 R, 525/220

[56] References Cited

U.S. PATENT DOCUMENTS

| | | | |
|---|---|---|---|
| 3,798,118 | 3/1974 | Jones | 428/516 |
| 3,813,278 | 5/1974 | Katagiri et al. | 428/40 |
| 4,079,554 | 3/1978 | Terwilliger | 428/40 |

Primary Examiner—P. C. Ives
Attorney, Agent, or Firm—Joshua J. Ward; Walter C. Kehm

[57] ABSTRACT

Plastic tile or similar items are disclosed having an adhesive backing suitable for adhesion to walls. The tiles are formulated from a vinyl chloride based resin and filler, and include a plasticizer of the formula:

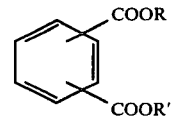

which R is a lower alkyl radical and R' is an aryl, aralkyl, or an alkaryl radical. A hot melt type pressure sensitive adhesive coating is provided on the plastic tile, the coating comprising a vinylic copolymer made of a minor portion of styrene units or derivatives thereof, and a major portion of butadiene, isoprene, or other similar units.

10 Claims, No Drawings

SELF-ADHESIVE PLASTIC TILE

CROSS-REFERENCE TO RELATED APPLICATION

This application is a continuation-in-part of my copending application Ser. No. 536,835 filed Dec. 27, 1974, now abandoned, for Plastic Tile and the Like Capable of Self-Adhesion to Walls.

BACKGROUND OF THE INVENTION

Adhesive-backed plastic tile is commercially available as a convenient substitute product for the conventional plastic tile, in which the adhesive is manually applied to the wall, and then the tile is manually applied to the adhesive-coated wall. A very substantial saving in labor and time is achieved by initially manufacturing the plastic tile with the adhesive already applied, so the user can simply remove a backing layer and install the tile on a surface without the need for applying an adhesive layer in a separate step.

However, particularly with wall tile, there has been no convenient adhesive which can be effectively applied to tile, other than inexpensive, light-weight vacuum-formed tile, capable of delivering desirable adhesion characteristics so that the tiles do not fall off of the wall after a period of time. In particular, the tile adhesive systems of the prior art have exhibited the undesirable characteristic of losing cohesive strength, due to the migration of plasticizer from the plastic tile to the adhesive. As a result of this, it has hitherto not been feasible to market adhesive-backed plastic wall tile, particularly in which the adhesive is of the "hot-melt" type. This latter type of adhesive is particularly unable to maintain adequate cohesive strength for use with heavy, high quality wall tile, because of the problem of plasticizer migration into the adhesive.

Tile with acrylic latex-type adhesive is less susceptible to a degradation of physical properties due to the migration of plasticizer, but acrylic latex adhesives are disadvantageous for other reasons. For example they require a significant drying time during manufacture, which results in a significantly lower manufacturing line speed and production rate.

Accordingly, there is a clear need for a hot-melt adhesive-backed plastic tile system in which the adhesive layer does not degrade to such a degree that it lacks adequate cohesive strength to support the tile on a vertical surface such as a wall.

The invention of this application provides such an adhesive-baked plastic member, typically a plastic wall tile, utilizing a plasticizer and a hot-melt adhesive system which results in a significantly reduced degradation of physical properties of the adhesive upon storage, so that commercially acceptable, adhesive-backed plastic wall tile and the like can be produced.

SUMMARY OF THE INVENTION

In accordance with this invention, plastic tile is provided which is suitable for adhesion to walls. The tile comprises vinyl chloride based resin, filler and a plasticizer at least about 90% of which consists of plasticizer of the formula:

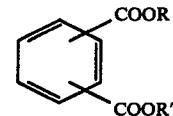

in which R is a lower alkyl radical and R' is selected from the group consisting of aryl, aralkyl, and alkaryl radicals. The tile has a hot-melt type pressure-sensitive adhesive coating, said adhesive coating comprising, as a resin ingredient, at least about 25 percent, usually from about 25 to about 85 percent by weight of a vinylic copolymer having less than 50 percent of styrene units and more than 50 percent of units selected from the group consisting of isoprene, butadiene and mixtures thereof.

DETAILED DESCRIPTION OF THE INVENTION

As mentioned above, plastic tiles formulated according to the invention include vinyl chloride based resin, filler and plasticizer of the type described above and are coated with a hot-melt type pressure sensitive adhesive of the type described above.

Vinyl chloride based resin suitable for use in tiles of the invention may be any of the conventional vinyl chloride based resins normally used in making vinyl floor or wall coverings. Suitable resins include for instance vinyl chloride homopolymers, vinyl chloride/vinyl acetate copolymers and mixtures thereof. It is preferred that vinyl chloride/vinyl acetate copolymers used have a ratio of vinyl chloride to vinyl acetate units between about 4 to 1 and about 10 to 1. Other suitable vinyl chloride based resins include, for instance, vinyl chloride copolymerized with such comonomers as vinylidene chloride, vinyl propionate, vinyl butyrate or the acrylates or methacrylates.

A preferred plasticizer of the type described above for use in the tile formulations utilized in this invention is butyl benzyl o-phthalate, which is a commercially available material, However, R may be any lower alkyl radical such as isopropyl, ethyl, pentyl, n-nexyl, or 2-ethylhexyl, R' may also be aryl radical such as phenyl, an aryl radical substituted by an alkyl group (alkaryl), such as tolyl, or an alkyl radical substituted with an aryl group (aralkyl) typified by benzyl. The latter aryl-substituted alkyl radicals are preferred. Materials with other R' groups could be inconvenient to manufacture on a commercial basis. Furthermore, the COOR and COOR' substituents on the benzene ring of the plasticizer used herein may be in the ortho, meta, or para position. Accordingly, plasticizers such as isopropyl benzyl o-phthalate, ethyl benzyl terephthalate, or butyl benzyl terephthalate can be used.

Small amounts of other plasticizers, such as epoxidized soybean oil, may be used in a mixture up to concentrations of about 10 percent by weight of the amount of the plasticizer described. Total plasticizer used is preferably between about 10 and about 60 pounds plasticizer per 100 pounds resin.

Filler useful in tile of the invention includes conventional fibrous or particulate tile fillers such as limestone or other calcium carbonate, asbestos, talc, organic fibers, etc. A combination of particulate and fiber filler is preferred. Filler is preferably used in tiles of the invention in amounts between about 60 and about 85 wt% of the total tile composition.

A preferred formulation of pressure-sensitive adhesive, for coating on the plastic tile formulation generally described above, may include from about 35 to 60 percent by weight of vinylic block copolymer having a minor portion of styrene units and a major portion of isoprene units. Preferably, about 10 to 35 percent by weight, more usually about 20 to 35 percent by weight of the vinylic copolymer of the invention may comprise styrene units (or, alternatively, alpha methyl styrene, ortho methyl styrene, or other related units,) while the balance of the copolymer comprises isoprene units. Alternatively, butadiene units or other homologs may be substituted for isoprene units. However, the substitution of other materials for styrene or isoprene in part or in whole generally changes the processing and other characteristics of the adhesive, and may require significant changes in the techniques of application of the adhesive to the tile. Such block copolymers are available from the Shell Chemical Company under the trademark "KRATON," and generally constitute thermoplastic elastomers.

The particularly preferred block copolymers contain a minor portion (i.e. less than 50 percent by weight) of a polystyrene moiety on each end of the polymer chains. Alternatively, poly(alpha methyl styrene) or other related units may also comprise the chain ends. The central portion of the preferred copolymer chains comprises a polybutadiene or polyisoprene chain, or a mixture of the two units, being present as the major proportion (in excess of 50 percent by weight) of the block copolymer molecule.

It is particularly preferred to select copolymers of the above formulation which, upon congealing when cooled from a melt, form sub-microscopic particles by physical association of the ends of the polymer molecules of a discrete and generally hard phase, while the mid-portions of the copolymer molecule form a continuous, elastomeric phase. Accordingly, these structures, of which Shell's Kraton elastomers are a commercial embodiment, act as a thermoplastic rubber, having good elastic strength properties at lower temperatures, and yet being capable of melting and flowing at high temperatures, and being soluble in various solvents.

The styrene-isoprene block copolymers, which are particularly preferred for use in this application, may have a solution viscosity, as a 10 percent (weight-/volume) solution in cyclohexane at 23° C., of about 90 to 100 centipoises (Brookfield viscosity), and a melt viscosity at 175° C., at a shear rate of 100 sec. −1 of about 1,000 to 1,200 poises.

Typical physical properties of the preferred styrene-isoprene block copolymers at 23° C., as determined in a tensile tester having a jaw separation speed of 10 inches per minute, and utilizing A.S.T.M. type "D" dumbells, are as follows. Tensile strength—3,000 to 3,200 psi; 300 percent modulus—80 to 120 psi; Elongation—1,200 to 1,400 percent; Angle tear strength—(A.S.T.M. method D 624, die B) 100 to 140 pli; Nicked crescent tear strength—(A.S.T.M. method D 624, die C) 110 to 150 pli.

However, other formulations of the preferred elastomers having different mechanical properties can be utilized, by appropriate changes in the formulation and application processes, for the adhesive used in this invention. For example, high viscosity, hot-melt adhesives may be applied by extrusion, rather than by the method disclosed below.

A preferred adhesive formula utilized in this invention may also contain from about fifteen to fifty weight percent of a "tack" promoting agent such as rosin ester Foral-85, manufactured by the Hercules Chemical Company, polyterpene resin such a Zonarez, manufactured by the Hercules Chemical Company or synthetic polyterpene resin such as Wingtack 95, manufactured by Goodyear Chemical Company; and may optionally include up to about twenty percent of other "tack" promoting agents such as poly(isobutylene) or Hydrocarbon Resin Betaprene, sold by the Reichold Chemical Company. Such "tack" promoting agents when used, are preferably present in amounts less than the amount of vinylic copolymer in the adhesive coating.

The preferred adhesive formula may also contain up to twenty percent of a plasticizer such as aromatic-free processing oil, which functions to further increase "tack," such as Shellflex 371, sold by the Shell Chemical Company or Tufflo 6204, sold by Arco Chemical Company. Other optional ingredients include extender resins such as ethylene-vinyl acetate copolymers, which also function to resist ozone and to act as an anti-oxidant, and other desired anti-oxidants and stabilizing agents against ultraviolet light and the like, which may be added in small quantities. Adhesives usable in this invention may be formulated, for example in accordance with U.S. Pat. Nos. 3,630,980 and 3,763,281.

Although the invention of this application is specifically discussed in the context of a plastic tile per se, the term "plastic tile" is, for the purposes of this application, contemplated to generally include other equivalent applications relating to all plastic objects which carry an adhesive layer for adhesion of the plastic object to various surfaces. This invention may be used whenever it is desired to prevent the degradation of the adhesive layer through migration of plasticizer from the plastic object to the adhesive layer, and thus may also be used in plastic wall brackets, fixtures, frames, and the like.

Accordingly, this invention provides for the first time a commercially acceptable plastic tile, or a related plastic object, having a "hot melt" type adhesive layer thereon which retains sufficient strength to permit the plastic member to be mounted on vertical surfaces, without the weight of the plastic member overwhelming the plasticizer-weakened tensile strength of the adhesive, to cause the tile to "creep" and to lose adhesion to the wall or other vertical surface.

In addition to the ingredients described above, tiles of the invention may also contain additional ingredients such as pigments, stabilizers, additional resins, decorative chips, etc. Suitable stabilizers include for instance such conventional stabilizers as barium and cadmium salts or calcium and zinc salts of organic acids or, if asbestos is present, dicyandiamide and are frequently used in amounts between about 4 and about 8 wt% based on resin. Suitable additional resins include for instance hydrocarbon or chlorinated hydrocarbon resins such as polyethylene or chlorinated polyethylene, conventional extender resins, etc., and may be present in amounts up to about 6 wt% of the tile composition. Plastic tile of the invention may also be protected with clear or decorative wear layers of the various types known for use on sheet vinyl or tile wall or floor coverings.

The following examples are for illustrative purposes only, and are not for the purpose of limiting the invention of this application, which is as defined in the claims below.

EXAMPLE 1

One foot square Vinyl-asbestos tiles of (1/16 inch thickness) were prepared from the following formulation:

| | |
|---|---|
| Vinyl Chloride-Vinyl Acetate Copolymer Resin | 15% by Weight |
| Extender Resin (poly alphamethylstyrene-Amoco 18-210 | 2% by Weight |
| Butyl Benzyl o-Phthalate Plasticizer | 5% by Weight |
| Stabilizer (Dicyandiamide-American Cyanamid) | 1% by Weight |
| Asbestos Fiber | 20% by Weight |
| Limestone Filler | 53% by Weight |
| Pigment | 4% by Weight |

The following hot-melt adhesive formulation was prepared:

| Ingredient | Approximate Amount |
|---|---|
| Styrene-Isoprene Block Copolymer (Kraton 1107-manufactured by the Shell Chemical Co.) | 55% by Weight |
| Polyterpene Resin (such as Zonarez of the Arizona Chemical Company) | 30% by Weight |
| Hydrocarbon Resin (such as Betaprene-Reichold Chemical Company) | 10% by Weight |
| Ethylene Vinyl Acetate Copolymer (Extender Resin) | 3% by Weight |
| Dilaurylthiodipropionate (American Cyanamide (Anti-oxidant Stabilizer) | 1% by Weight |
| 1,3,5 trimethyl-2,4,6-tris (3,5-di-tert-butyl-4-hydroxybenzyl) benzene (Anti-oxidant and Ultraviolet Stabilizer) | 1% by Weight |

The above hot-melt adhesive was applied to the back of the tiles in a quadrangular pattern of 17 quads to the inch in both directions, at a rate of six to nine grams of adhesive per square foot of tile surface.

The term "quad" implies a little pyramid of adhesive, and the above terminology refers to a checkerboard array of small protusions of adhesive, separated by about one seventeenth of an inch.

The adhesive is applied by passing the tile under a printing roll on a M.R. Hot-Melt coater manufactured by the Specialty Automatic Machine Corp. of Burlington, Mass. The adhesive is applied in a temperature range of 325° to 400° F., and then allowed to cool.

For storage of the tile, the adhesive coating may be overlaid with silicone release paper of the type manufactured for example by the Brown Paper Company of Kalamazoo, Mich. When the tile is desired for use, the silicone release paper is pulled off the tile, and the tile simply pressed into position as desired on a surface.

The adhesive coated tiles manufactured in accordance with this Example were tested for their adhesion properties in the following manner:

A one inch portion of the length of an adhesive-coated tile cut to a dimension of one inch by two and a half inches was manually adhered in lapped relation to the surface of an adhesive-free tile made in accordance with this Example. The resulting composite was allowed to stand at 77° F. for two hours. The composite was then pressed together at the lapped joint between the two tiles at 3 pounds per square inch for one minute.

Thereafter, each tile composite was pulled apart with an Instron tensile tester, with the tiles being pulled apart along the plane of the tiles at a rate of two inches per minute. The maximal force at the moment of breakage between the two lapped tiles was determined in pounds per square inch, with the result of three separate tests being averaged together.

By this test, the bond strength of the freshly prepared adhesive coated tile was found to be about 42 psi.

Similarly prepared, bonded tile composites were stored for fifteen weeks at 140° F. in an air-circulating oven, and then tested in the manner described above. The average bond strength was about 36 psi.

EXAMPLE 2

The procedure of Example 1 was reproduced, with the exception that the butyl benzyl phthalate utilized in Example 1, above, to manufacture the tiles was replaced with diisononyl phthalate plasticizer.

For testing, tile composites were prepared in accordance with Example 1 above. The initial bond strength was about 42 psi. However, upon storage for fifteen weeks at 140° F. in an air-circulating oven, the bond strength deteriorated to about 13 psi. This is generally insufficient to permit the tiles to retain good adhesion to a wall.

EXAMPLE 3

A one foot square adhesive coated plastic tile produced as described in Example 1, containing gray, mortar-color pigment, was applied to a vertical wall surface with the adhesive coating on the back of the tile in contact with the wall surface. Several similar smaller adhesive coated plastic tiles shaped and colored to give the planar appearance of brick, stone or slate were then similarly applied in spaced relation to each other to the mortar-colored surface of the one foot square tile, thereby obtaining a 3-dimensional surface displaying brick, stone or slate separated by lower-level (mortar-colored) grout or joints. This lamination of (1) wall, (2) adhesive, (3) tile, (4) adhesive, and (5) tile layers was found to have improved resistance to separation over extended periods of time despite the exposure of adhesive layer (4) to the deteriorating influence of plasticizer migration from both underlying tile layer (3) and overlying tile layer (5).

EXAMPLE 4

In order to assess the bond strength of adhesive coated plastic tile prepared using different plasticizers and adhesives, a series of tests as described below were conducted. For these tests a number of one foot square vinyl asbestos tiles of 1/16 inch thickness were prepared using a tile formulation similar to that given in Example 1 except that the plasticizer used in preparing the tile was varied as indicated below. The following tile formulation was used:

| Ingredient | Weight % |
|---|---|
| Copolymer Vinyl Chloride/Vinyl Acetate | 16.5 |
| Plasticizer | 5.0 |
| Stabilizer (dicyandiamide) | 1.0 |
| Tall Oil Rosin-WWX Extender Resin | 0.7 |
| Poly (-methyl styrene) | 0.8 |
| Asbestos Fiber | 17.0 |
| Limestone Filler | 59.0 |
| TOTAL | 100.0 |

These tiles were then coated with one of two hot melt adhesive formulations in the manner set forth in Example 1 except that a pattern of 25 quads to the inch was used and either one or two passes through the adhesive coating step were made to deposit 6 grams of adhesive per square foot of tile surface or 9 grams per square foot as indicated below. The adhesive identified as adhesive A herein was the same adhesive used in Example 1. Adhesive B was a commercially available adhesive believed to have the following formulation:

| Ingredient | Weight % |
| --- | --- |
| Polyterpene Polymer | 60% |
| Ethylene Vinyl Acetate Copolymer | 12% |
| Styrene Isoprene Copolymer (Kraton 1107) | 20% |
| Polyethylene | 7% |
| Dilaurylthiodipropinate | 0.5% |
| 1,3,5 trimethyl-2,4,6-tris (3,5-di-tert butyl-4-hydroxybenzyl benzene | 0.5% |
| TOTAL | 100.0% |

The plasticizers used in preparing tiles for this series of experiments were:

| Butyl Benzyl Phthalate | (BBP) |
| --- | --- |
| Diisononyl Phthalate | (DINP) |
| Diisodecyl Phthalate | (DIDP) |
| Epoxydized Soy BeanOil | (ADMEX) |
| $C_7$-$C_{11}$ Alcohol Triester of 1,2,4-benzene Tricarboxylic Acid | (Trimellitate) |

Table I shows the results of testing a number of these one foot square samples of asbestos tile identified as Sample Nos. 1–16 for adhesion properties. The indication $S^{(1)}$ after the identification of the plasticizer used indicates that the adhesive was applied in a single pass using the 25 quad roll resulting in adhesive application at the rate of 6 grams per square foot of tile surface coated. Likewise, the notation $D^{(2)}$ indicates that the sample was double-coated using the 25 quad roll to produce a total coating of 9 grams per square foot of tile. The coated tiles were cut to dimensions of 1" by 2¼", formed into lapped composite test samples and tested for bond strength in the manner described in Example 1. The bond strength of the fresh sample is reported in Table I under the heading Immed. psi. The samples were then stored for 16 weeks at 140° F. in an air circulating oven and the bond strength was tested at periodic intervals using the same test procedure with results shown in Table I.

In addition to the tests reported in Table I using adhesive A, two additional tile samples (identified below as Samples 17 and 18) were prepared, coated and tested in the manner described above with respect to the tile Samples 1–16 except that samples 17 and 18 were coated with adhesive B. Test results for these samples are reported in Table II.

TABLE I

| Sample No. | | Immed. psi | 1 wk psi | 2 wks psi | 3 wks psi | 4 wks psi | 6 wks psi | 8 wks psi | 10 wks psi | 12 wks psi | 14 wks psi | 16 wks psi |
| --- | --- | --- | --- | --- | --- | --- | --- | --- | --- | --- | --- | --- |
| 1 | DINP-$S^{(1)}$ | 36.5 | 25.9 | 12.3 | 9.1 | 9.8 | 6.2 | 4.8 | 4.8 | 3.1 | 1.2 | 1.2 |
| 2 | DINP-$d^{(2)}$ | 29.6 | 32.7 | 45.6 | 27.2 | 25.8 | 20.4 | 25.3 | 21.8 | 19.6 | 18.5 | 16.0 |
| 3 | 90% BBP-10% Admex-$S^{(1)}$ | 32.6 | 35.9 | 46.9 | 29.3 | 35.6 | 47.6 | 28.7 | 23.2 | 25.4 | 29.4 | 22.2 |
| 4 | 90% BBP-10% Admex-$d^{(2)}$ | 33.1 | 45.8 | 63.4 | 42.2 | 46.5 | 46.1 | 42.6 | 44.9 | 38.8 | 45.8 | 39.8 |
| 5 | 100% BBP-$S^{(1)}$ | 35.7 | 39.3 | 40.8 | 38.8 | 31.0 | 34.7 | 23.9 | 40.9 | 31.8 | 32.4 | 20.1 |
| 6 | 100% BBP-$D^{(2)}$ | 43.8 | 41.3 | 59.4 | 42.8 | 49.5 | 41.8 | 33.7 | 43.0 | 34.8 | 44.8 | 40.9 |
| 7 | 97% BBP-3% Admex-$S^{(1)}$ | 25.8 | 47.8 | 46.3 | 44.2 | 27.1 | 32.9 | 38.1 | 39.6 | 37.5 | 26.8 | 25.8 |
| 8 | 97% BBP-3% Admex-$D^{(2)}$ | 35.9 | 38.8 | 57.5 | 39.8 | 48.0 | 46.9 | 35.7 | 41.2 | 39.8 | 44.8 | 35.2 |
| 9 | 63% DIDP-32% BBP-$S^{(1)}$-5% Admex | 26.5 | 33.5 | 33.4 | 32.2 | 24.2 | 14.8 | 15.9 | 12.9 | 10.3 | 8.6 | 9.6 |
| 10 | 63% DIDP-32% BBP-$D^{(2)}$5% Admex | 25.5 | 33.6 | 50.7 | 38.7 | 47.5 | 32.9 | 28.3 | 27.1 | 32.7 | 18.2 | 19.3 |
| 11 | 63% BBP-32% DIDP-$S^{(1)}$-5% Admex | 26.3 | 34.0 | 37.7 | 35.6 | 30.0 | 26.0 | 20.6 | 21.4 | 19.5 | 17.0 | 18.0 |
| 12 | 63% BBP-32% DIDP-$D^{(2)}$-5% Admex | 34.2 | 34.1 | 46.9 | 50.0 | 48.0 | 49.1 | 29.5 | 40.0 | 30.5 | 37.8 | 14.2 |
| 13 | 100% DIDP-$S^{(1)}$ | 24.1 | 26.2 | 21.2 | 5.7 | 6.0 | 3.4 | 2.5 | 0 | 2.3 | 0 | 0 |
| 14 | 100% DIDP-$S^{(2)}$ | 31.3 | 33.5 | 34.0 | 38.2 | 43.5 | 29.0 | 15.5 | 12.9 | 8.6 | 7.7 | 6.7 |
| 15 | Trimellitate Ester-$D^{(2)}$ | 28.3 | 13.6 | 11.6 | — | 7.7 | 5.2 | 4.7 | 5.4 | 5.7 | 3.8 | 3.4 |
| 16 | 50% Trimellitate Ester-50% BBP-$D^{(2)}$ | 23.6 | 14.9 | 13.3 | — | 10.3 | 9.0 | 8.2 | 8.1 | 10.5 | 7.7 | 7.4 |

TABLE II

| 17 | DINP-$D^{(2)}$ | 16.4 | 7.5 | 5.2 | — | 4.2 | 3.3 | 2.5 | 2.4 | 5.0 | 2.9 | 2.0 |
| --- | --- | --- | --- | --- | --- | --- | --- | --- | --- | --- | --- | --- |
| 18 | BBP-$D^{(2)}$ | 20.7 | 9.3 | 14.1 | — | 19.9 | 18.1 | 23.2 | 27.6 | 50.0+ | — | 50.0+ |

The tests reported above in Tables I and II and described herein provide both qualitative and quantitative information concerning adhesion strength over long periods of time under conditions of normal use. Based upon floor tile installations which have been in use for a period of at least five years, there is a good correlation between the accelerated tests described herein wherein tile samples are stored at a temperature of 140° F. and actual experience in the field over a number of years. In general, a period of one week storage at 140° F. can be considered equivalent in the effect upon the strength of the adhesive to a period of time of 1–2 years for installed tile at normal room temperature and humidity. Tiles which retain satisfactory bond strength through the entire 16 week accelerated test period can therefore reasonably be expected to retain adequate bond strength for a minimum of 15–20 years under conditions of normal room temperature and humidity. In this respect adhesion strengths of substantially less than about 10 psi are questionable and for practical use adhesion strengths of at least on the order of 20 psi are considered desirable.

Referring to Table I above, it can be seen that the tile samples in which BBP was the plasticizer performed significantly better at a given level of adhesion application, i.e. 6 or 9 grams per square foot, than did tile samples in which other plasticizers were substituted in whole or in part for the BBP. Likewise, the data presented in Example 2 indicates a definite superiority for the tile sample utilizing BBP as a plasticizer. With respect to the data reported in Table II, the marginal bond strength found after one week of high temperature storage for Sample 18 is believed due to the fact that the adhesive used did not contain as much antioxidant and block copolymer (Kraton 1107) as might have been desired. The drop in bond strength followed by subsequent increase is considered typical of behavior to be expected over a long period of time even for entirely satisfactory adhesive coated tile. When antioxidant is essentially depleted, hot melt adhesives coated on tiles tend to become gummy and then harden with additional aging. For satisfactory tile this initial softening upon depletion of antioxidant should not take place for a period of many years since it might be anticipated that some failures in terms of tile falling off of walls might be experienced during the "gummy" phase. For this reason, while Adhesive B confirmed the results obtained with Adhesive A in terms of advantages of the adhesive-plasticizer combination which is the subject of the invention, Adhesive B might not be considered totally satisfactory for commercial use due to its low antioxidant level.

EXAMPLE 5

Another preferred hot-melt adhesive formulation for use on tiles of the type described in Example 1 is:

| Ingredient | Amount (wt. %) |
| --- | --- |
| Styrene-Isoprene Block Copolymer (Kraton 1107) | 75% |
| Tufflo 6204 Processing Oil | 20% |
| Poly(isobutylene) | 3% |
| Dilaurylthiodipropionate | 1% |
| 1,3,5 trimethyl-2,4,6-tris (3,5-di-tert-butyl-4-hydroxybenzyl) benzene | 1% |

This invention has been disclosed with respect to certain preferred embodiments, and it is understood that various modifications and variations thereof which will become obvious to persons of ordinary skill in the art are included within the spirit and purview of this application.

What is claimed is:

1. Plastic tile suitable for adhesion to walls, said plastic tile comprising vinyl chloride resin selected from the group consisting of vinyl chloride vinyl acetate copolymer, vinyl chloride homopolymer and mixtures, thereof, filler, and between about 10 and about 60 pounds per hundred pounds vinyl chloride resin of a plasticizer at least about 90% of which consists of butyl benzyl phthalate, said plastic tile having a hot-melt type pressure-sensitive adhesive coating, said adhesive coating comprising, as a resin ingredient, at least about 25 percent by weight of a vinylic copolymer having less than about 50 percent of styrene-type units and more than about 50 percent of units selected from the group consisting of isoprene, butadiene, and mixtures thereof.

2. Plastic tile according to claim 1, in which filler is present in an amount between about 60% and about 85 wt% of the tile formulation.

3. Plastic tile of claim 2 in which the filler comprises both fibrous material and particulate inorganic material.

4. Plastic tile of claim 3 in which the filler comprises asbestos and limestone.

5. Plastic tile of claim 3 in which the filler comprises organic fiber and calcium carbonate.

6. Plastic tile of claim 1 in which said resin of the adhesive coating is vinylic block copolymer of styrene and isoprene.

7. Plastic tile of claim 6 in which said block copolymer of the adhesive coating contains from 10 to 35 percent by weight of styrene units, the balance comprising isoprene units.

8. Plastic tile of claim 7 in which said adhesive coating comprises about 15 to 50 wt% of a "tack" promoting agent, and up to 20 wt% of a plasticizer.

9. Plastic tile of claim 8 in which said adhesive layer is overlaid with silicone release paper.

10. Plastic tile of claim 8 in which from 25 to 85 weight percent of said block copolymer is present in the adhesive layer.

* * * * *